Patented July 7, 1936

2,046,852

UNITED STATES PATENT OFFICE 2,046,852

CELLULOSE DERIVATIVE

Walther Schrauth, Berlin-Dahlem, Germany

No Drawing. Application April 11, 1934, Serial No. 720,075. In Germany April 13, 1933

9 Claims. (Cl. 106—40)

This invention relates to the use of chemical compounds and more particularly refers to the uses of ethers of glycerol and polyglycerol with plastic compositions.

It is an object of this invention to utilize the ethers of glycerol and polyglycerol and their esterified derivatives in the production of superior plastic compositions. An additional object is the incorporation of ethers and/or their esterified derivatives as solution, gelatinizing and softening agents in lacquers, films, threads, plastic substances and the like. Another object is the incorporation of these compounds in cellulose derivatives as well as in natural and synthetic resins. Additional objects will become apparent from a consideration of the following specification.

These objects are attained according to the herein described invention wherein glycerol or polyglycerol is etherified with higher molecular aliphatic saturated or unsaturated alcohols or their derivatives, the etherifying radical containing at least 8 carbon atoms in the molecule. In place of the aforementioned aliphatic alcohols alicyclic alcohols may be substituted. The resulting ethers may be used without further change in configuration or they may be esterified, preferably with aliphatic acids, and the esterified derivatives used in place of or in admixture with unesterified ethers. The aforementioned products are then incorporated in cellulose derivatives, natural and synthetic resins, lacquers, etc. in accordance with the procedure well known to one familiar with the art.

The invention may be more readily understood by a consideration of the following illustrative examples in which the quantities are stated in parts by weight:

Coating Compositions

Example 1

| | Parts |
|---|---|
| Collodion (moistened with 25 parts of spirit) | 25 |
| Dodecyl-glycerine-ether-acetate | 10 |
| Albertol resin | 3 |
| Butyl acetate | 100 |
| Toluene | 200 |

Example 2

| | Parts |
|---|---|
| Acetyl cellulose | 20 |
| Octyl-glycerine-ether | 8 |
| Lactic acid ethyl-ester | 100 |
| Acetone | 50 |
| Alcohol | 50 |
| Benzene | 50 |

Example 3

| | Parts |
|---|---|
| Cellulose nitrate | 25 |
| Acetate of monolauryl ether of glycerol | 10 |
| Albertol resin | 3 |
| Solvent | 100 |

Example 4

| | Parts |
|---|---|
| Cellulose acetate | 20 |
| Mono-octyl ether of glycerol | 8 |
| Solvent | 250 |

Example 5

| | Parts |
|---|---|
| Ethyl cellulose | 12 |
| Laurate of di-decyl ether of polyglycerol | 4 |
| Solvent | 180 |

Example 6

| | Parts |
|---|---|
| Cellulose isobutyrate | 12 |
| Pigment | 16 |
| Resin | 3.5 |
| Oil | 3.5 |
| Isobutyrate of dicetyl ether of di-glycerol | 4 |
| Solvent | 81 |

Example 7

| | Parts |
|---|---|
| Aldehyde modified polyvinyl acetate | 10 |
| Caproate of di-octyl ether of glycerol | 2 |
| Solvent | 100 |

Plastic Compositions

Example 8

| | Parts |
|---|---|
| Cellulose nitrate | 100 |
| Di-propionate of mono-octyl ether of glycerol | 60 |
| Pigment | 200 |

Example 9

| | Parts |
|---|---|
| Ethyl cellulose | 100 |
| Monolauryl ether of glycerol | 15 |

Example 10

| | Parts |
|---|---|
| Cellulose propionate | 100 |
| Di-propionate of di-decyl ether of di-glycerol | 20 |

Example 11

| | Parts |
|---|---|
| Acetyl cellulose | 10 |
| Cyclohexyl-glycerin-ether | 3 |
| Ethyl alcohol | 30 |
| Benzene | 45 |

Example 12

| | Parts |
|---|---|
| Acetyl cellulose | 5 |
| Butyrate of cetyl-glycerine-ether | 2 |
| Acetone | 10 |
| Ethyl alcohol | 20 |
| Toluene | 15 |

Example 13

| | Parts |
|---|---|
| Cellulose nitrate | 40 |
| Cetyl-diglycerol-ether | 40 |
| Damar resin | 30 |
| Ethyl alcohol | 150 |
| Acetone | 120 |
| Toluene | 150 |

Example 14

| | Parts |
|---|---|
| Cellulose nitrate | 75 |
| Condensation product of diglycerol and of the alcohol obtainable by catalytic reduction of naphthenic acid | 50 |
| Triphenyl phosphate | 15 |

In the above examples it is to be understood that the term "solvent" designates suitable mixtures of acids, alcohols and hydrocarbons which are commonly used in the industrial art for this purpose.

It is to be understood that the aforementioned examples are illustrative merely of compositions wherein the new ethers and their derivatives described herein are incorporated. These ethers and their esterified derivatives may be incorporated with numerous other compounds in order to produce plastic compositions and coating compositions. Among the compounds falling within this category mention may be made of cellulose derivatives such as cellulose butyrate, cellulose crotonate, benzyl cellulose, lauryl cellulose, and butyl cellulose; resins such as damar, kauri, sandarac, shellac, polymerized vinyl acetate, phenol-aldehyde resins, polybasic acid-polyhydric alcohol resins, ether resins, ketone resins and various other well known natural and synthetic resins or condensation products. The resulting compositions are of considerable value in the industrial arts and have a multitude of uses.

The ethers comprised herein may be produced by reacting an alkyl sulfuric acid, the alkyl radical of which contains at least 8 carbon atoms, with glycerin or poly-glycerin in an alkaline medium. These compounds may likewise be produced by reacting an alkyl chloride, the alkyl radical of which contains at least 8 carbon atoms, with sodium-glyceroxide or sodium-poly-glyceroxide. In place of the aforementioned ethers wherein the etherifying radical is the residue of an aliphatic compound there may be similarly produced ethers wherein the etherifying radical is the residue of an alicyclic compound.

In producing ethers of glycerol and/or polyglycerol wherein the etherifying radical is an aliphatic compound this radical should contain at least 8 carbon atoms and preferably should be a straight chain aliphatic radical containing from 8 to 18 carbon atoms. These etherifying radicals may be either saturated or unsaturated, in many cases a mixture of compounds containing saturated and unsaturated etherifying radicals producing very satisfactory results. For some purposes a mixture of compounds containing etherifying radicals having from 12 to 16 carbon atoms are particularly satisfactory and better than an unmixed compound. Among etherifying radicals falling within this category mention may be made of octyl, nonyl, decyl, octadecyl, lauryl, myristyl, cetyl, oleyl and ricinoleyl. As previously mentioned, in place of the aliphatic etherifying group an alicyclic radical may be used. Alicyclic radicals which are typical of this class are cyclopentyl, cyclohexyl, methyl cyclohexyl, naphthenyl, abietyl and hydroabietyl. It is to be understood that this invention comprises the production of polyethers of glycerol or polyglycerol wherein the resulting ethers may contain more than one of the aforementioned aliphatic radicals or more than one of the aforementioned alicyclic radicals, or a mixture of the aforementioned aliphatic and alicyclic etherifying radicals or the aforementioned aliphatic and/or alicyclic etherifying radicals in addition to other etherifying radicals which may then contain less than 8 carbon atoms in the group.

It is frequently advantageous to etherify the glycerol or polyglycerol with a mixture of alcohols or their derivatives. For example, the mixture of alcohols derived by the sodium or catalytic reduction of coconut or palm kernel oil may be utilized in producing products coming within the scope of this invention. These coconut or palm kernel alcohols contain large portions of lauryl alcohol as well as lower and higher members of the fatty alcohol series. Very satisfactory results have been attained by removing those members of the series lower than the lauryl alcohol and utilizing the higher alcohols having not less than 12 carbon atoms, and particularly alcohols having from 12 to 18 carbon atoms, in the production of the aforementioned ethers. However, it is to be understood that those alcohols lower than lauryl alcohol and having 8 or more carbon atoms are contemplated for use according to the instructions given herein. In place of alcohols obtained from coconut and palm kernel oils mixtures of alcohols, the compositions of said mixtures being determined according to the boiling points of the individual components, derived from other natural sources may be substituted. Alcohols derived from natural sources contemplated herein are for instance those from sperm oil, montan wax, castor oil, wool fat, beeswax, etc. In this connection it may be stated that alcohols containing a mixture of saturated and unsaturated constituents are frequently quite advantageous. Alcohols from sperm oil contain the unsaturated oleyl constituent as well as the saturated stearyl and cetyl constituents, consequently they may advantageously be used in producing ethers of glycerol and polyglycerol. In place of the aforementioned mixture of saturated and unsaturated alcohols mixtures of alcohols containing other saturated and/or unsaturated constituents as well as varying proportions of these components may be selected.

The aforementioned ethers may be utilized by incorporation with coating compositions and plastics including cellulose derivatives, natural and synthetic resins. Likewise, these ethers may first be esterified and then incorporated with the usual components of coating compositions and plastics. The esterifying constituent is preferably an aliphatic monocarboxylic acid. Representative examples of such acids are acetic, propionic, butyric, isobutyric, crotonic, lactic, levulinic, caproic, lauric, oleic, methoxyacetic, ricinoleic, stearic, myristic, elaidic, eleostearic, as well as mixtures of fatty acids. Suitable mixtures of fatty acids are mixures of the aforementioned in varying proportions as well as mixtures of the various other acids which would occur to one skilled in the art from a consideration of the aforementioned well known acids. Furthermore, the mixture of acids occurring in natural substances may be utilized, for instance those mixtures of acids obtained from oils and fats such as coconut oil, wool fat, etc. In general, it is preferable to introduce not more than one esterifying radical into the ether of glycerol or polyglycerol. However, it is to be understood that in its broadest scope this invention comprises the introduction of more than one esterifying radical into said ethers. In the event that more than one esterifying radical is introduced into the ethers described herein the first esterifying radical should advisably be selected from among the aforementioned acids and the remaining esterifying radical or radicals may be selected from the same acids or from other and quite unrelated acids. The means of producing esters are well known and may be exemplified by reacting the etherified glycerol or polyglycerol or mixtures of the same with the desired acids in the presence of an agent having an avidity for water such as sulfuric or phosphoric acid.

The herein described ethers and polyethers of glycerol and polyglycerol as well as the mono- and poly-esterified derivatives thereof are believed to be compounds which were heretofore unknown. These new compounds and mixtures thereof are of particular value in the preparation of coating compositions and plastics of various types. They may be used in the coating of metal, wood, fabric, paper, wire, wire screen, etc. Likewise they may be used in the preparation of the numerous types of compositions containing cellulose derivatives, particularly cellulose esters and ethers, as well as in the preparation of natural and synthetic resins having desirable characteristics. Purposes for which they have the widest application are in the preparation of lacquers and enamels, in the preparation of dopes for coating fabrics, moisture-proof lacquers for coating regenerated cellulose, paper, etc. In the plastic art they are of pronounced value in the manufacture of toilet-ware, novelties, sheeting, rods, tubes, safety-glass interlayers, dentures, and similar well known products. The aforementioned compounds may furthermore be used in place of or in conjunction with prior art plasticizers.

As many apparently widely different embodiments of this invention may be made without departing from the spirit and scope thereof, it is to be understood that the invention is not limited to the specific embodiments thereof except as defined in the appended claims.

I claim:
1. Cellulose derivatives containing as a plasticizer ethers of glycerol and polyglycerol wherein the etherifying group is a straight chain alkyl radical containing from 8 to 18 carbon atoms.
2. The products defined in claim 1 characterized in that the ethers are unesterified.
3. Cellulose derivatives containing as a plasticizer the ethers of claim 1 characterized in that they are esterified with aliphatic monocarboxylic acids.
4. Cellulose derivatives containing as a plasticizer mono ethers of glycerol wherein the etherifying radical is an alkyl group containing at least eight carbon atoms.
5. Cellulose esters containing as a plasticizer ethers of glycerol wherein the etherifying group is a straight chain alkyl radical containing from 12 to 18 carbon atoms.
6. Cellulose esters containing as a plasticizer mono ethers of glycerol wherein the etherifying group is a straight chain alkyl radical containing from twelve to eighteen carbon atoms.
7. Cellulose esters containing as a plasticizer the ethers of claim 5 characterized in that they are esterified with aliphatic monocarboxylic acids.
8. Cellulose acetate containing as a plasticizer ethers of glycerol wherein the etherifying group is a straight chain alkyl radical containing from 12 to 18 carbon atoms.
9. Cellulose acetate containing as a plasticizer the ethers of claim 8 characterized in that they are esterified with aliphatic monocarboxylic acids.

WALTHER SCHRAUTH.